(12) United States Patent  (10) Patent No.: US 8,994,785 B2
Seo et al.  (45) Date of Patent: Mar. 31, 2015

(54) METHOD FOR GENERATING VIDEO DATA AND IMAGE PHOTOGRAPHING DEVICE THEREOF

(75) Inventors: Jung-pa Seo, Gyeonggi-do (KR); Jang-hoon Yoo, Seoul (KR); Liefeng Zhao, Gyenoggi-do (KR)

(73) Assignee: Samsung Electronics Co., Ltd (KR)

( * ) Notice: Subject to any disclaimer, the term of this patent is extended or adjusted under 35 U.S.C. 154(b) by 436 days.

(21) Appl. No.: 13/350,218

(22) Filed: Jan. 13, 2012

(65) Prior Publication Data

US 2012/0242783 A1  Sep. 27, 2012

(30) Foreign Application Priority Data

Mar. 25, 2011 (KR) ........................ 10-2011-0026988

(51) Int. Cl.
 *H04N 5/262* (2006.01)
 *G06T 3/00* (2006.01)
 *H04N 5/232* (2006.01)

(52) U.S. Cl.
 CPC .......... *G06T 3/0087* (2013.01); *H04N 5/23238* (2013.01)
 USPC ......................................................... 348/36

(58) Field of Classification Search
 None
 See application file for complete search history.

(56) References Cited

U.S. PATENT DOCUMENTS

| 7,336,299 | B2 | 2/2008 | Kostrzewski et al. | |
| 7,486,324 | B2 | 2/2009 | Driscoll et al. | |
| 2002/0126913 | A1* | 9/2002 | Kotake et al. | 382/282 |
| 2003/0098909 | A1 | 5/2003 | Fritzsche et al. | |
| 2004/0227817 | A1* | 11/2004 | Oya et al. | 348/155 |
| 2006/0120624 | A1* | 6/2006 | Jojic et al. | 382/284 |
| 2009/0213231 | A1* | 8/2009 | Kurokawa | 348/208.1 |
| 2011/0085022 | A1* | 4/2011 | Wang | 348/36 |

FOREIGN PATENT DOCUMENTS

| KR | 1020040002682 | 1/2004 |
| KR | 1020060039896 | 5/2006 |
| KR | 1020080003345 | 1/2008 |
| KR | 1020090014643 | 2/2009 |
| KR | 1020090062881 | 6/2009 |

* cited by examiner

*Primary Examiner* — William C Vaughn, Jr.
*Assistant Examiner* — Eileen Adams
(74) *Attorney, Agent, or Firm* — The Farrell Law Firm, P.C.

(57) ABSTRACT

A method for generating video data and an image photographing device implementing the same are provided. The method includes acquiring annular panoramic video data by performing panoramic video photographing, selecting an extraction area from each frame of the annular panoramic video data, and generating video data by combining the extraction area selected from each frame.

16 Claims, 8 Drawing Sheets

METHOD FOR GENERATING VIDEO DATA AND IMAGE PHOTOGRAPHING DEVICE THEREOF

PRIORITY

This application claims priority to Korean Patent Application No. 10-2011-0026988, filed on Mar. 25, 2011, in the Korean Intellectual Property Office, the entire content of which is incorporated herein by reference.

BACKGROUND

1. Field of the Invention

The present invention relates generally to generating video data, and more particularly, to an image photographing device and method for generating video data through the image photographing device capable of capturing 360° panoramic video.

2. Description of the Related Art

Conventionally, an image photographing device with a panorama annular lens system has been used to capture a 360° field of view. Such panorama annular lens systems provide a 360° field of view based on reflection and refraction of light.

A conventional image photographing device directly may show a donut-shaped image acquired through the panorama annular lens system, or provides the acquired image as a rectangular-shaped image after distortion correction.

However, a user of a conventional image photographing device is not able to acquire video in intended formats, since only donut-shaped or rectangular-shaped videos are provided by the panorama annular lens system. For example, when donut-shaped video is directly played back, the user may not be satisfied with the view, since must always view the image through a full 360° field of view. It is also difficult for a user to acquire only the image of a specific area from within the 360°-wide image.

Accordingly, a method for generating a video as intended by a user, by editing video captured using a panorama annular lens system is required.

SUMMARY OF THE INVENTION

Embodiments of the present invention are provided to address the above-described disadvantages as well as other disadvantages not described above. Also, embodiments of the present invention are not required to overcome the disadvantages described above, and some embodiments of the present invention may not overcome any of the above-described problems.

According to one aspect of the present invention, a method for generating video data in an image photographing device is provided. The method includes acquiring annular panoramic video data by performing panoramic video photographing, selecting an extraction area from each frame of the annular panoramic video data, and generating video data by combining the extraction area selected from each frame.

According another aspect of the present invention, an image photographing device is provided. The device includes a photographing unit for acquiring annular panoramic video data by performing panoramic video photographing, a control unit for, if an extraction area is selected from each from of the annular panoramic video data, generating video data by combining the extraction area selected from each frame, and a display unit for displaying the generated video data.

BRIEF DESCRIPTION OF THE DRAWINGS

The above and/or other aspects of the present invention are made more apparent by describing certain embodiments thereof with reference to the accompanying drawings, in which.

DETAILED DESCRIPTION OF EMBODIMENTS OF THE PRESENT INVENTION

Certain embodiments of the present invention are described in greater detail herein with reference to the accompanying drawings.

In the following description, same drawing reference numerals are used for the same elements even in different drawings. The matters defined in the description, such as detailed construction and elements, are provided to assist in a comprehensive understanding of the present invention. Accordingly, it is apparent that embodiments of the present invention may be implemented without those specifically-defined matters. Also, well-known functions or constructions are not described in detail since they would obscure the invention with unnecessary detail.

Figure 1:
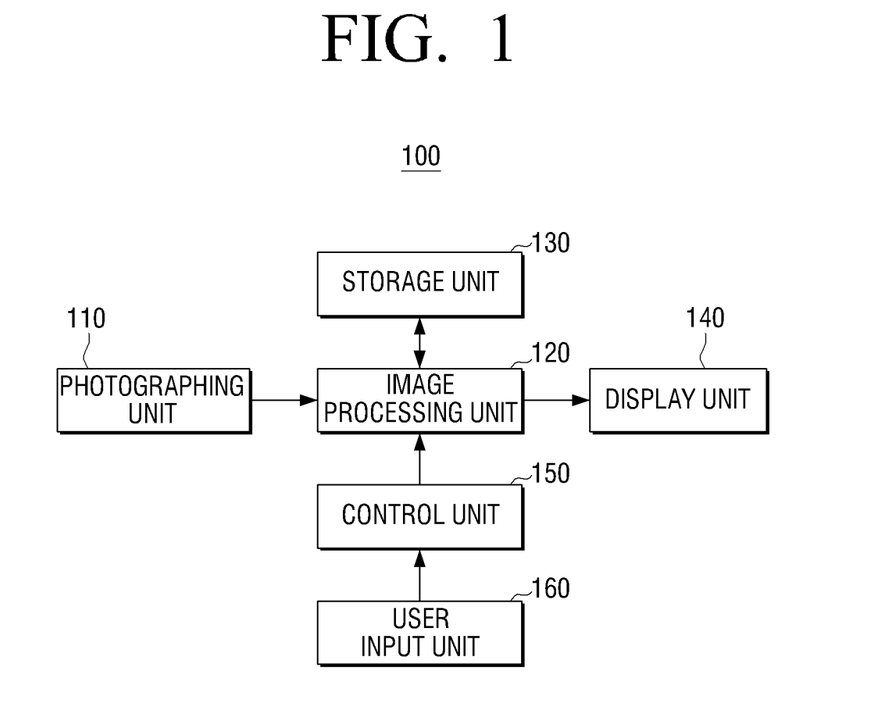
FIG. 1 is a schematic block diagram illustrating an image photographing device according to an embodiment of the present invention.

FIG. 1 is a schematic block diagram of an image photographing device according to an embodiment of the present invention. Referring to FIG. 1, an image photographing device 100 may include a photographing unit 110, a storage unit 120, an image processing unit 130, a display unit 140, a control unit 150, and a user input unit 160.

The image photographing device 100 performs panoramic video photography using a panorama annular lens system included in the photographing unit 110 to acquire annular panoramic video data. More specifically, the photographing unit 110 converges an annular panoramic image of 360° field of view on an image sensor area, using the panorama annular lens system. An image sensor (not illustrated) then photoelectrically converts the light that has entered through the panorama annular lens system into an electric signal.

The image processing unit 120 processes the converted electric signal, to acquire the annular panoramic video data. The annular panoramic video data is stored in the storage unit 130 and/or displayed through the display unit 140.

Further, under the control of the control unit 150, the image processing unit 120 may process the signals of the annular panoramic video data so that specific areas of the respective frames of the annular panoramic video data are generated as new video data.

After the signal processing at the image processing unit 120, the storage unit 130 stores the annular panoramic video data in a compressed form. Additionally, the storage unit 130 may store information regarding an adjacent map image (e.g., an illustration of building interior or a map), or store Global Positioning System (GPS) information of the location of the annular panoramic video data captured.

The storage unit 130 may be implemented by various forms of storage, such as a non-volatile memory or a hard disk.

The display unit 140 may display the annular panoramic video data received from the image processing unit 120. At this time, the display unit 140 may display all of or a portion of the annular panorama video data. Additionally, the display unit 140 may display the video data generated by the control of the control unit 150. Accordingly, the user may view the annular panoramic video data displayed on the display unit 140, or video data generated under the control of the control unit 150.

The user input unit 160 receives user commands. The user input unit 160 may be implemented by various input units, such as a touch screen, or a movement detecting unit that detects a motion of the image photographing device 100 to determine a user input. However, the touch screen and movement detecting unit are merely described as examples, and the user input unit 160 may be implemented by other forms of inputs or sensors, such as switches, buttons, etc.

The control unit 150 analyzes user commands transmitted from the user input unit 160, and controls the overall operation of the image photographing device 100 according to the analyzed user commands.

For example, the control unit 150 may select an extraction area from each frame of the annular panoramic video data acquired through the photographing unit 110, and generate video data using the selected extraction area of each frame. This process is explained in greater detail herein with reference to FIGS. 2 to 6.

Figure 2:
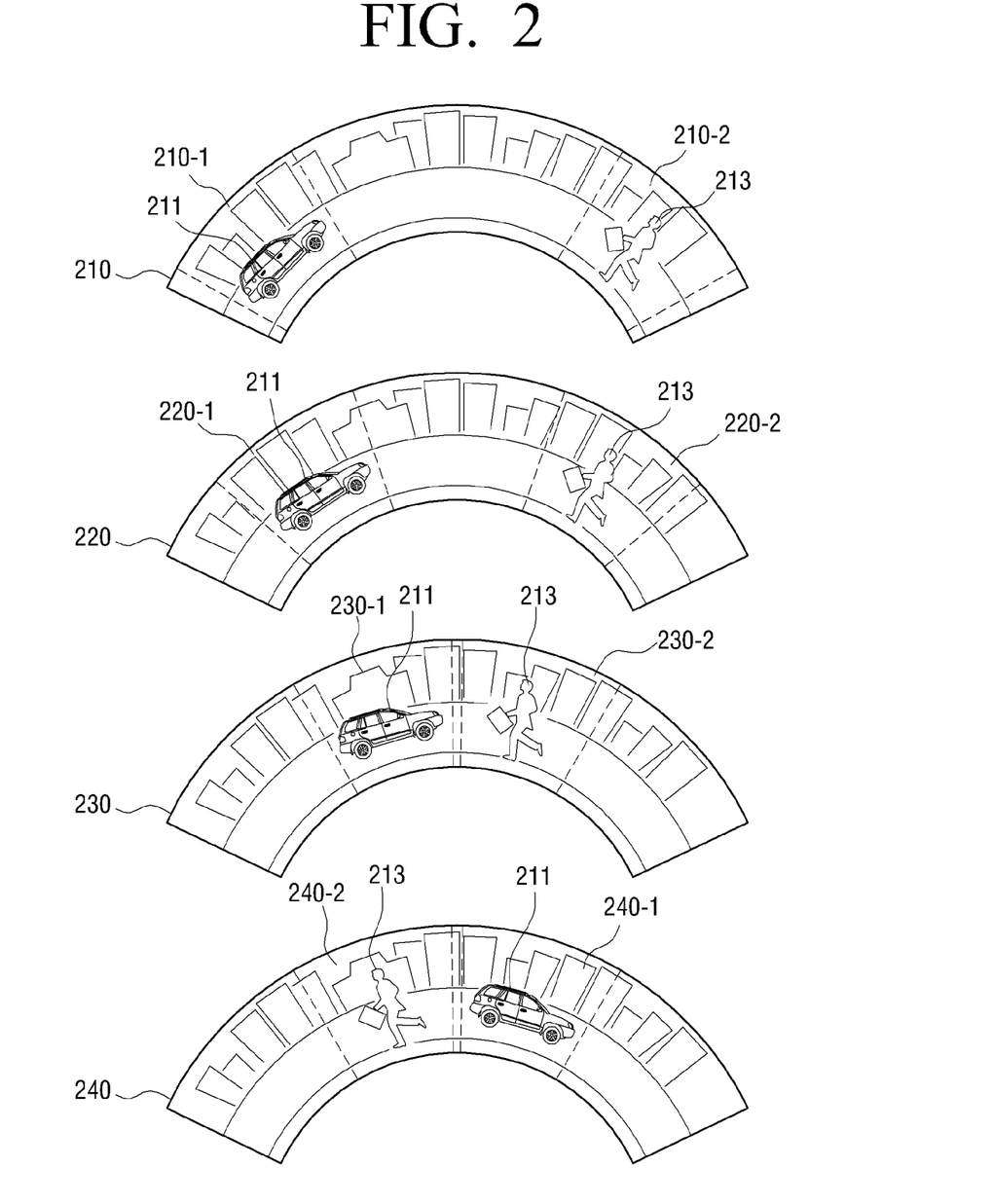
FIG. 2 is a diagram illustrating frames of annular panoramic video data for a method for generating video data containing an object as detected by an image photographing device, according to another embodiment of the present invention.

FIG. 2 is a diagram illustrating frames of annular panoramic video data for a method for generating video data containing a moving object detected by an image photographing, according to another embodiment of the present invention.

Referring to FIG. 2, four frames 210, 220, 230, and 240 of the annular panoramic video data are illustrated. The first, second, third and fourth frames 210, 220, 230, and 240 are captured in order. Meanwhile, the first to fourth frames 210, 220, 230, and 240 are particularly donut-like annular panoramic images, but for convenience of explanation, portions of these frames are illustrated as arc-like panoramic images.

The control unit 150 detects moving objects 211 and 213 through the first to fourth frames 210, 220, 230, and 240. The 'moving object' herein refers to an object that is displayed in varying locations depending on the respective frames of the annular panoramic video data, and a method for detecting the moving object may include measuring a variation in pixels of the respective frames.

The control unit 150 then selects an extraction area containing a moving object in each frame. For example, as for the extraction area containing the first object 211, a first extraction area 210-1 from the first frame 210, a second extraction area 220-1 from the second frame 220, a third extraction area 230-1 from the third frame 230, and a fourth extraction area 240-1 from the fourth frame, are selected. Also, as for the extraction area containing the second object 213, a fifth extraction area 210-2 from the first frame 210, a sixth extraction area 220-2 from the second frame 220, a seventh extraction area 230-2 from the third frame 230, and a eighth extraction area 240-2 from the fourth frame, are selected.

The control unit 150 then generates at least one video data using the extraction areas selected from the respective frames. By way of example, the control unit 150 may generate a first video by using the first to fourth extraction areas 210-1, 220-1, 230-1, and 240-1 containing the first object 211 as the respective frames. Further, the control unit 150 may generate a second video, which is distinct from the first video, by using the fifth to eight extractions areas 210-2, 220-2, 230-2, and 240-2 as the respective frames. Accordingly, the user is enabled to generate video data having a plurality of scenarios, by using one annular panoramic video data.

Figure 8:
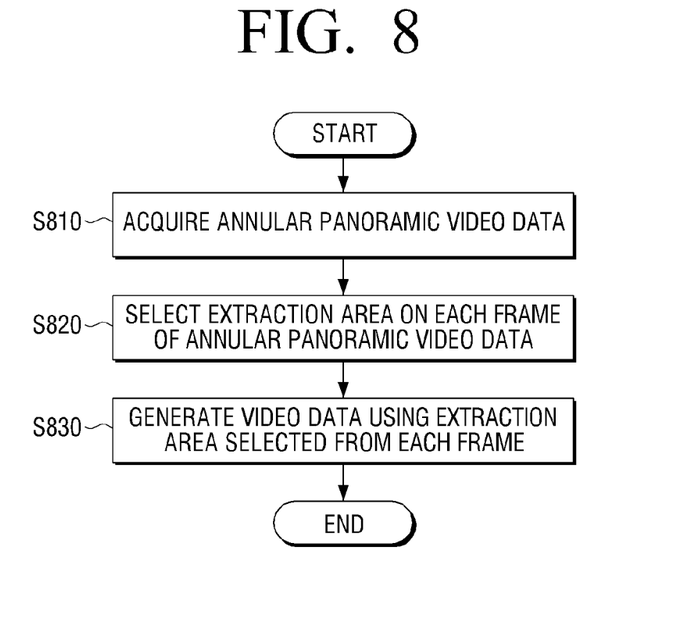
FIG. 8 is a flowchart illustrating a method for generating video data, according to another embodiment of the present invention.

Further, referring to FIG. 8, the generated first and second video data may be displayed in an arc-form, instead of being converted into a rectangular form, in order to minimize the distortion correction.

Meanwhile, although the embodiment explained above focused on detecting a moving object and generating video data, this example is provided only for illustrative purpose. Accordingly, technical concepts of this embodiment of the present invention are also implementable to other examples, such as a case of detecting other object like human face and generating video data according to the detected human face.

Figure 3:
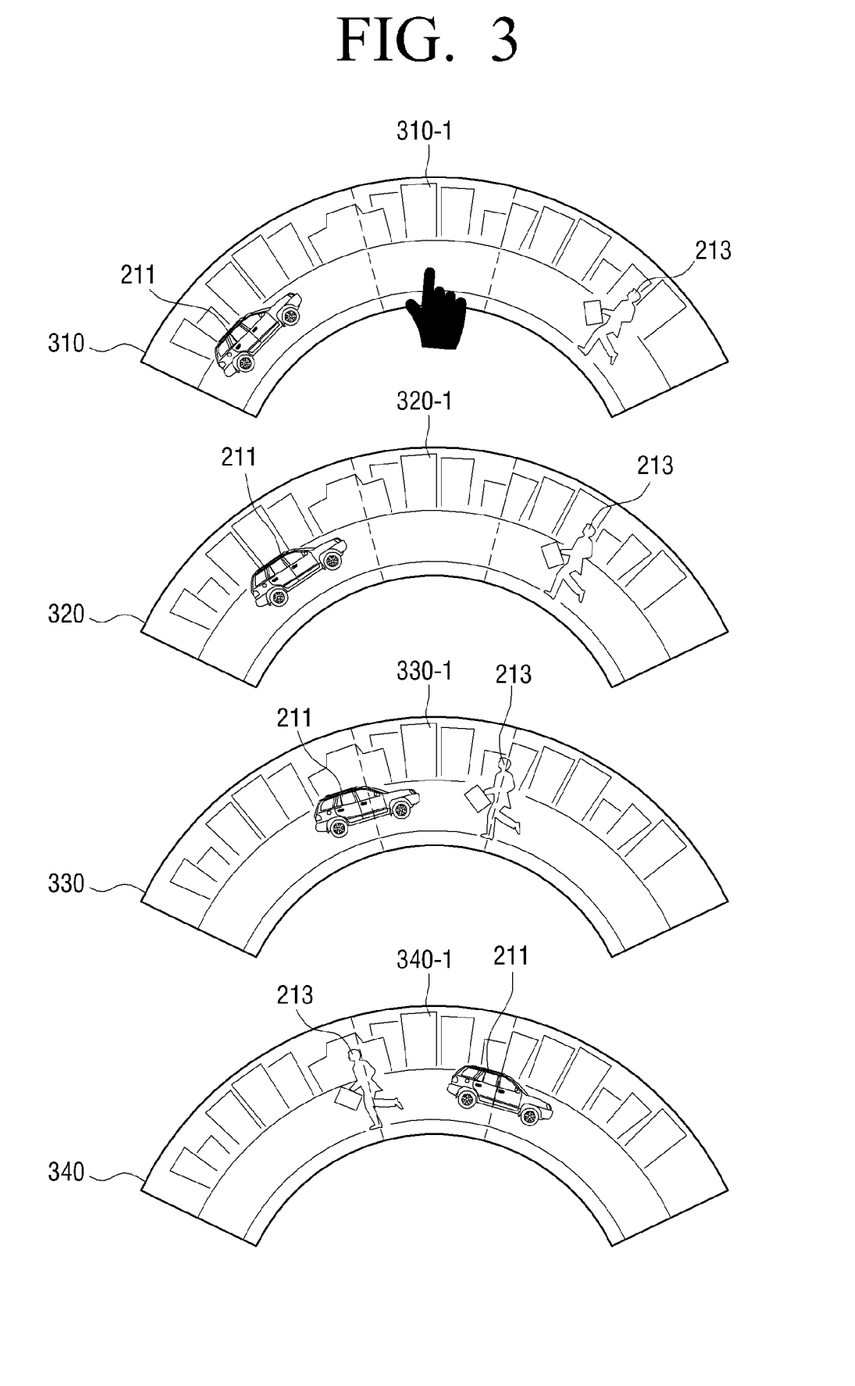
FIG. 3 is a diagram illustrating frames of annular panoramic video data for a method for generating video data using a specific area selected by a user, according to another embodiment of the present invention.

FIG. 3 is a diagram illustrating frames of annular panoramic video data for a method for generating video data using a specific area selected by a user, according to another embodiment of the present invention.

Referring to FIG. 3, the control unit 150 selects extraction areas 310-1, 320-1, 330-1, and 340-1 of the selected frames 310, 320, 330, and 340 through the user input unit 160. The method for selecting the extraction areas of the frames may be implemented through various user inputs 160. For example, a user may select part of the annular panoramic image currently displayed as the extraction area, using a touch screen. To be specific, the currently-displayed annular panoramic image may move leftward when the touch screen is dragged to the left, or the currently-displayed annular panoramic image may move rightward when the touch screen is dragged to the right. Accordingly, the user may drag the touch screen to the left or right directions, and consecutively touch the touch screen as the user sees the intended area displayed, so that the control unit 150 selects the intended area as the extraction area.

As an alternative example, a user may select part of the currently-displayed annular panoramic image as an extraction area using a motion detecting unit. To be specific, the control unit 150 may detect the motion detecting unit so that when the image photographing device 100 is shaken to a left direction, the currently-displayed annular panoramic image is moved to the left, and when the image photographing device 100 is shaken to a right direction, the currently-displayed annular panoramic image is moved to the right. Accordingly, the user may incline the image photographing device 100 to left and right directions, and shakes the image photographing device 100 in vertical direction when he sees the intended area displayed, so that the control unit 150 selects the intended area as the extraction area. The motion detecting unit may be implemented as a gyro sensor or an acceleration sensor.

The embodiment for selecting an extraction area using touch screen or a motion detecting unit is described as an example, and accordingly, the extraction area may be selected using other types of input units such as buttons, remote controller, etc., in accordance with embodiments of the present invention.

Referring to FIG. 3, the extraction areas 310-1, 320-1, 330-1, and 340-1 may be at the same location of the respective frames. If the user selects the extraction area 310-1 through the first frame 310 of the annular panoramic video data, the rest frames 320, 330, and 340 select the extraction areas 320-1, 330-1, and 340-1 of the rest frames 320, 330, and 340 at the same location as that of the extraction area 310-1 of the first frame. However, this selection is only an example, and other embodiments may be implemented. For example, the user may directly select the extraction areas of each of the respective frames.

The control unit 150 then generates video data using the extraction areas selected from the respective frames. For example, the control unit 150 may generate video data using the extraction areas 310-1, 320-1, 330-1, and 340-1 selected from the respective frames 310, 320, 330, and 340.

Figure 9:
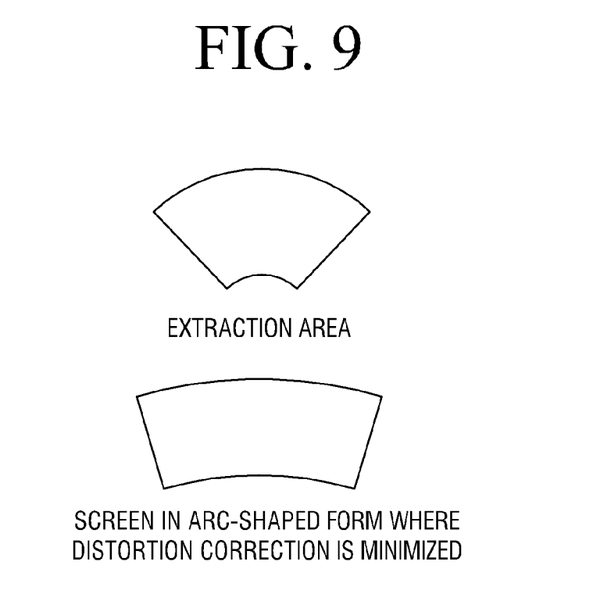
FIG. 9 is a diagram illustrating an arc-shaped image to minimize amount to be processed by distortion correction, according to another embodiment of the present invention.

As shown in FIG. 9, for example, the generated video data may be displayed in an arc pattern to minimize distortion correction, instead of being converted into rectangular form.

Figure 4:
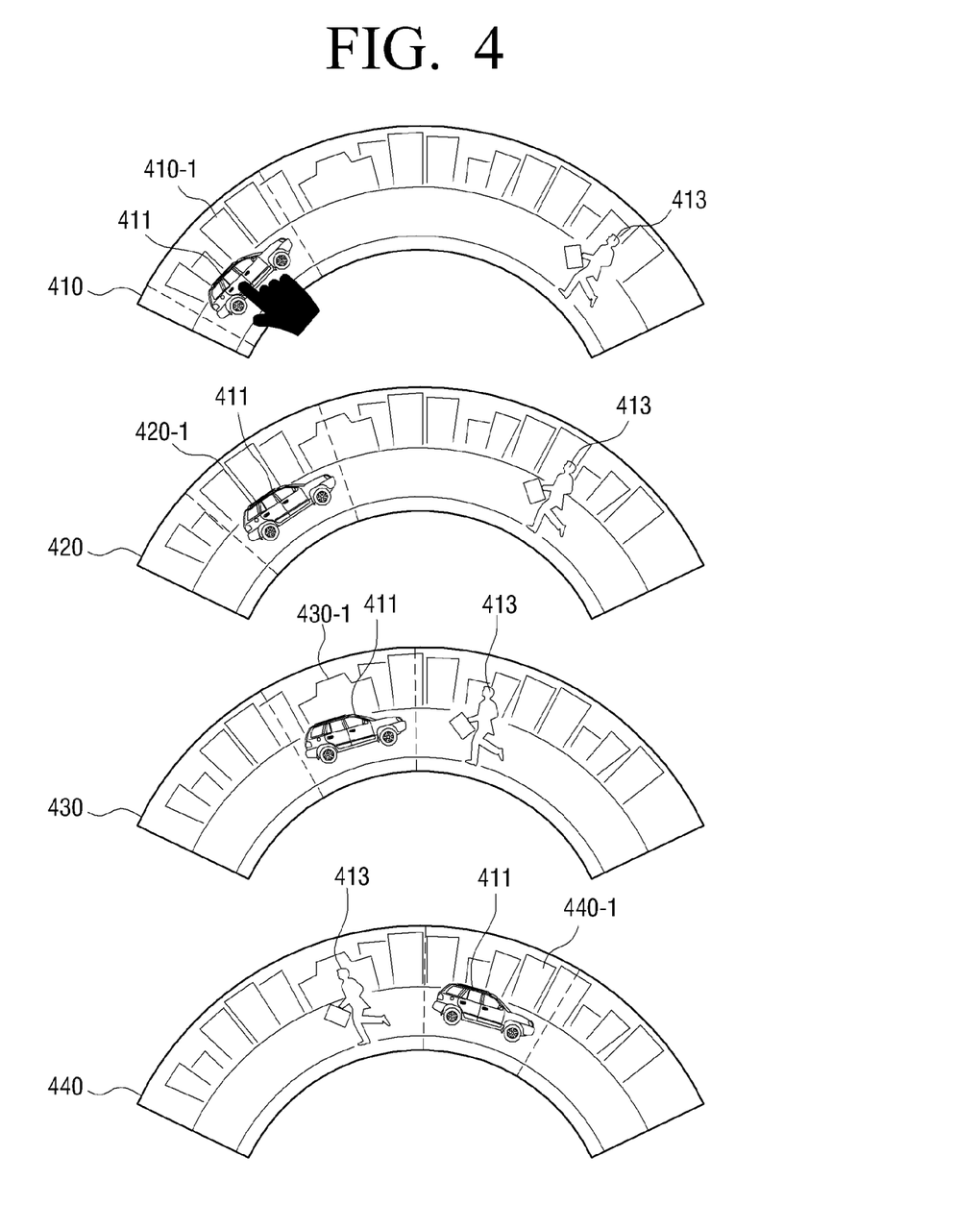
FIG. 4 is a diagram illustrating frames of annular panoramic video data for a method for generating video data containing an object selected by a user, according to another embodiment of the present invention.

FIG. 4 is a diagram illustrating frames of annular panoramic video data for a method for generating video data containing an object selected by a user, according to another embodiment of the present invention.

Referring to FIG. 4, the control unit 150 selects an extraction area 410-1 containing an object 411 selected from the first frame 410 through the user input unit 160. As shown in frame 410, the object 411 herein may be selected using touch screen.

The control unit 150 then selects extraction areas containing the selected object from the respective frames. For example, the control unit 150 may select a first extraction area 410-1 from the first frame 410, a second extraction area 420-1 from the second frame 420, a third extraction area 430-1 from the third frame 430, and a fourth extraction area 410-1 from the fourth frame 410, as the extraction areas containing the object 411 selected using the touch screen.

The control unit 150 then generates video data using the extraction areas selected from the respective frames. For example, the control unit 150 may generate video using the first to fourth extraction areas 410-1, 420-1, 430-1, and 440-1 containing the object 411 selected by the touch screen as the respective frames.

Again, referring to FIG. 8, the generated video data may be displayed in an arc pattern, instead of being converted into rectangular form, in order to minimize distortion correction.

Figure 5A:
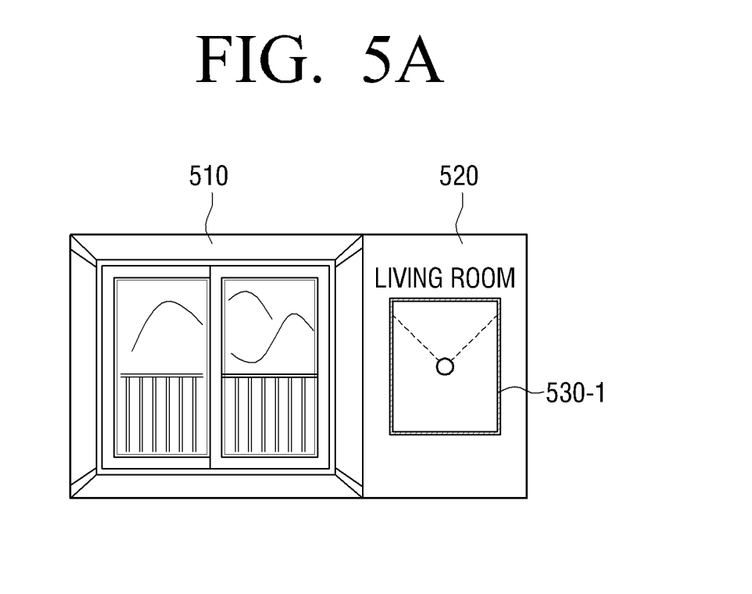
FIGS. 5A and 5B are diagrams illustrating video data generated using adjacent map images, according to another embodiment of the present invention.
Figure 5B:
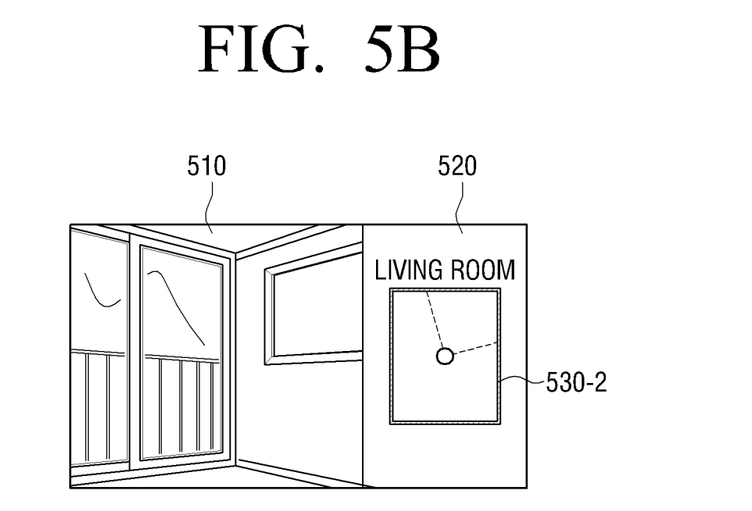

FIGS. 5A and 5B are diagrams illustrating a method video data generated using adjacent map images, according to another embodiment of the present invention.

Referring to FIGS. 5A and 5B, if the annular panoramic video data relates to the interior of a building, the adjacent map image may be an illustration of the interior of the building. Further, if the annular panoramic video data relates to an exterior, then the adjacent map image may be an exterior map.

The control unit 150 may match the annular panoramic video data with the pre-stored adjacent map image, so that the control unit 150 may display the extraction area, selected from the annular panoramic video data, along with the adjacent map image on which the extraction area is identified. To be specific, referring to FIG. 5A, if the first extraction area 510 relates to a northern area of the annular panoramic video data, the control unit 150 may display the adjacent map image 520 on which the extraction area is identified as a northern area on a separate area 530-1 from the first extraction area 510.

Further, the control unit 150 may match the annular panoramic video data with the adjacent map image, so that the control unit may play back the generated video data, along with the adjacent map image on which the extraction area of the video data is identified. In particular, if the video data containing an extraction area as illustrated in FIG. 5A and an extraction area as illustrated in FIG. 5B are played back, the adjacent map image may also played back, moving from the northern part 530-1 to the north-eastern part 530-2.

Since the extraction area is displayed along with the adjacent map image, the user is able to confirm the site of photographing and image of such site with ease.

Figure 6:
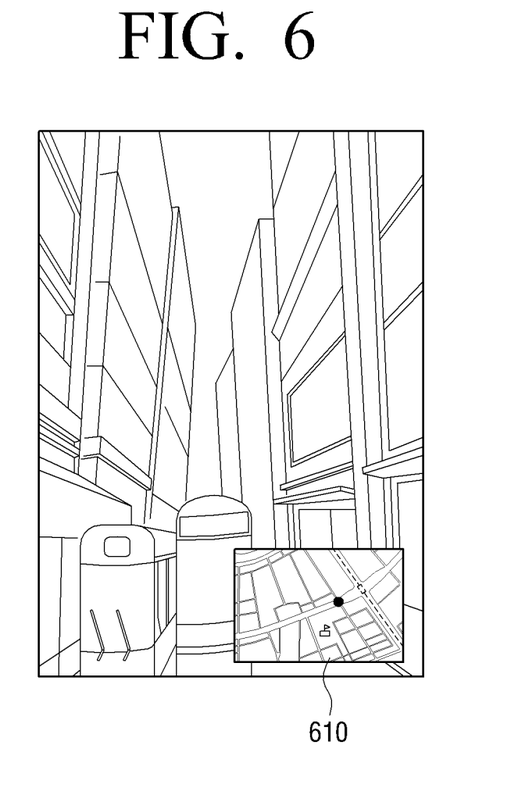
FIG. 6 is a diagram illustrating video data generated using GPS information, according to another embodiment of the present invention.

FIG. 6 is a diagram illustrating video data generated using GPS information, according to another embodiment of the present invention.

Referring to FIG. 6, while photographing panoramic video, the control unit 150 may store the GPS information about the location at which the panoramic video is photographed, along with the annular panoramic video data. Herein, the location of photography may be measured through a sensor.

The control unit 150 may then generate the video data using the GPS information stored along with the video data. While generating video data using the photographed annular panoramic video data, the control unit 150 may display a map 610, which indicates location information of the photographed annular panoramic image. However, the above-described map 610 is only one of several possible examples. Accordingly, other location information such as a name of a place, longitude, latitude, or the like may also be displayed in the image of FIG. 6, in accordance with embodiments of the present invention. As a result, the user is able to confirm the location information of the annular panoramic image with ease.

Figure 7:
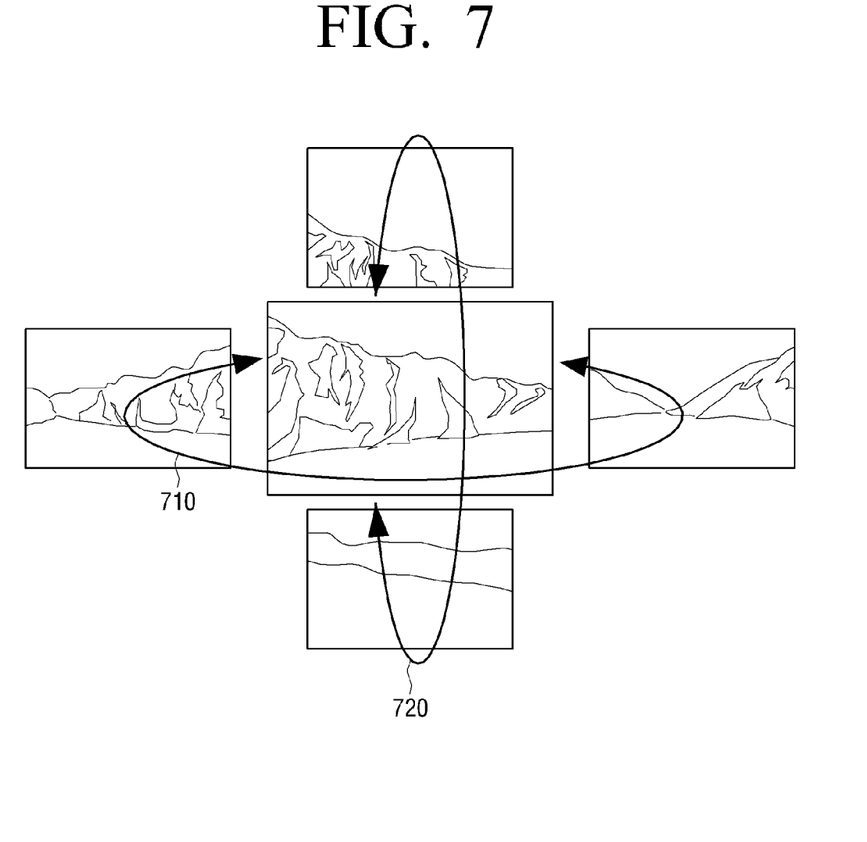
FIG. 7 is a diagram illustrating panoramic video data for a method for providing spherical panoramic video data, according to another embodiment of the present invention.

FIG. 7 is a diagram illustrating panoramic video data for a method for providing annular panoramic video data, according to another embodiment of the present invention.

Referring to FIG. 7, the photographing unit 110 may acquire annular panoramic video data in horizontal and perpendicular directions with respect to the surface of the earth, respectively. Accordingly, the control unit 150 may provide spherical panoramic video data using the annular panoramic video data in horizontal and perpendicular directions with respect to the surface of the earth, both acquired through the photographing unit 110.

As shown in FIG. 7, a 360° panoramic image is provided in a horizontal direction 710 with respect to the surface of the earth, based on the annular panoramic image in the horizontal direction 710. Meanwhile, a 360° panoramic image is also provided in a perpendicular direction 720 with respect to the surface of the earth, based on the annular panoramic image in the perpendicular direction 720.

The control unit 150 may also generate video data using any of the methods of FIGS. 2 to 4, based on the spherical panoramic video data. Accordingly, the user is able to acquire panoramic images in more diverse directions.

FIG. 8 is a flowchart illustrating a method for generating video data according to another embodiment of the present invention.

Referring to FIG. 8, in step S810, the image photographing device 100 acquires annular panoramic video data using a panorama annular lens. Herein, the panoramic video data with a 360° field of view is acquired.

At step S820, the image photographing device 100 selects extraction images from the respective frames of the annular panoramic video data. As for the method for selecting the extraction images, referring to FIG. 2, the image photographing device 100 may detect a specific object included in the frame of the annular panoramic video data, and select the area containing the detected specific object as an extraction area. Alternatively, referring to FIG. 3, specific areas of the respective frames selected through the user input unit 160 may be used as the extraction areas, or referring to FIG. 4, the areas of the respective frames containing a specific object selected through the user input unit 160 may be selected as the extraction areas of the respective frames.

At step S830, the image photographing device 100 combines the selected extraction areas from the respective frames to generate video data. As a result, the user is able to edit video with ease using annular panoramic video data and also generate diverse images.

The foregoing embodiments and advantages are merely examples and are not to be construed as limiting the present invention. The described operations can be readily applied to other types of apparatuses. Also, the description of the embodiments of the present invention is intended to be illustrative, and does not limit the scope of the claims, and many alternatives, modifications, and variations will be apparent to those skilled in the art.

What is claimed is:

1. A method for generating video data in an image photographing device, comprising:
    acquiring annular panoramic video data by performing panoramic video photographing using a panorama annular lens system;
    selecting an extraction area from each frame of the annular panoramic video data by automatically detecting an object included in the annular panoramic video data and selecting an area including the detected object from each frame of the annular panoramic video data, wherein a location of the object is different in each respective frame; and
    generating video data by combining the extraction area including the detected object selected from each frame as arc-shaped video data in order to minimize a distortion correction.

2. The method of claim 1, wherein selecting the extraction area comprises selecting an area of the annular panoramic video data touched by a user on a touch screen.

3. The method of claim 1, wherein selecting extraction area comprises:
    detecting a shaking of the image photographing device;
    moving, when the detected shaking is horizontal shaking, a displayed area of the annular panoramic video data in a screen of the image photographing device; and
    selecting, when the detected shaking is vertical shaking, an area on the annular panoramic video data displayed when vertical shaking is performed as the extraction area.

4. The method of claim 1,
    wherein selecting the extraction area comprises, if an object included in the annular panoramic video data is selected according to a user touch, selecting an area including the selected object of each frame of the annular panoramic video data as the extraction area.

5. The method of claim 1, further comprising:
    matching the annular panoramic video data with an adjacent map image; and
    displaying the extraction area selected from the annular panoramic video data along with the adjacent map image, such that the extraction area is identified on the adjacent map image.

6. The method of claim 1, further comprising:
    matching the annular panoramic video data with an adjacent map image; and
    while playing back the generated video data, additionally playing back the adjacent map image, such that the extraction area of the video data is identified on the adjacent map image.

7. The method of claim 1, further comprising:
    storing, while photographing the panoramic video, Global Positioning System (GPS) information of a location at which the panoramic video is photographed; and
    additionally displaying, while playing back the generated video data, the location at which the extraction area of the video data is photographed, using the GPS information.

8. The method of claim 1, wherein acquiring the annular panoramic video data comprises:
    acquiring first annular panoramic video data in a horizontal direction with respect to the surface of the earth; and
    acquiring second annular panoramic video data in a perpendicular direction with respect to the surface of the earth, and
    wherein the method further comprises providing spherical panoramic video data using the first and second annular panoramic video data.

9. An image photographing device, comprising:
    a photographing unit for acquiring annular panoramic video data by performing panoramic video photographing using a panorama annular lens system;
    a control unit for:
        selecting an extraction area from each frame of the annular panoramic video data by automatically detecting an object included in the annular panoramic video data and selecting an area including the detected object from each frame of the annular panoramic video data, wherein a location of the object is different in each respective frame, and
        generating video data by combining the extraction area including the detected object selected from each frame as arc-shaped video data in order to minimize a distortion correction; and
    a display unit for displaying the generated video data.

10. The image photographing device of claim 9, further comprising a touch screen unit for detecting a touch of a user on the display unit,
    wherein the control unit selects an area on the annular panoramic video data at which a user touch is made.

11. The image photographing device of claim 9, further comprising a motion detecting unit for detecting a shaking of the image photographing device,
    wherein, when the motion detecting unit detects a horizontal shaking of the image photographing device, and the control unit moves a displayed area of the annular panoramic video data on the display unit, and
    wherein, when the motion detecting unit detects a vertical shaking of the image photographing device, and the control unit selects an area on the annular panoramic video data displayed when the vertical shaking is performed as the extraction area.

12. The image photographing device of claim 9, further comprising a touch screen unit for detecting a touch of a user on the display unit, wherein if an object included in the annular panoramic video data is selected according to a user touch, the control unit selects an area including the selected object of each frame of the annular panoramic video data as the extraction area.

13. The image photographing device of claim 9, wherein the control unit matches the annular panoramic video data with an adjacent map image, and controls so that the extraction area selected from the annular panoramic video data is displayed along with the adjacent map image, such that the extraction area is identified on the adjacent map image.

14. The image photographing device of claim 9, wherein the control unit matches the annular panoramic video data with an adjacent map image, and controls the display unit such that, while the generated video data is played back, the adjacent map image on which the extraction area of the video data is identified is additionally played back.

15. The image photographing device of claim 9, further comprising a storage unit, wherein the control unit controls such that, while the panoramic video is photographed, Global Positioning System (GPS) information of a location at which the panoramic video is photographed is stored, and while the generated video data is played back, the location at which the extraction area of the video data is photographed is additionally played back using the GPS information.

16. The image photographing device of claim 9, wherein the photographing unit acquires first annular panoramic video data in a horizontal direction with respect to the surface of the earth, and acquires second annular panoramic video data in a perpendicular direction with respect to the surface of the earth, and the control unit provides spherical panoramic video data using the first and second annular panoramic video data.

* * * * *